United States Patent [19]

Hope et al.

[11] Patent Number: 5,221,717

[45] Date of Patent: Jun. 22, 1993

[54] CITRACONIMIDE (CO)POLYMERS AND CURING WITH ANIONIC CATALYST

[75] Inventors: Peter Hope, HL Twello; Auke G. Talma, AT Bathmen; Andreas P. van Swieten, HM Velp, all of Netherlands

[73] Assignee: Akzo N.V., Arnhem, Netherlands

[21] Appl. No.: 822,167

[22] Filed: Jan. 16, 1992

[30] Foreign Application Priority Data

Jan. 16, 1991 [EP] European Pat. Off. ........ 91200077.5

[51] Int. Cl.⁵ .................... C08F 8/30; C08F 4/04; C08F 26/06
[52] U.S. Cl. .................... 525/375; 526/262; 526/261; 526/219.1
[58] Field of Search .......................... 525/375

[56] References Cited

U.S. PATENT DOCUMENTS 4,653,584  3/1987  Ball et al. ............... 166/273

FOREIGN PATENT DOCUMENTS

| 0108461 | 5/1984 | European Pat. Off. . |
| 0407661A1 | 1/1991 | European Pat. Off. . |
| 1230612A | 11/1988 | Japan . |
| 1-230612 | 9/1989 | Japan . |
| 49825 | 11/1965 | Luxembourg . |
| 91/00879 | 1/1991 | World Int. Prop. O. . |

OTHER PUBLICATIONS

Polymer Journal, vol. 12, No. 11, pp. 799-807 (1980) by Tsutomu Oishi.
Polymer Journal, vol. 13, No. 1, pp. 65-74 (1981) by Tsutomu Oishi.
Polymer, vol. 6, pp. 419-426 (1965) by R. C. P. Cubbon.
J. Polymer Science, Part A-B, vol. 4, pp. 1121-1134 (1966) by Kojima, Yoda and Marvel.
31st International SAMPE Symposium, vol. 31, pp. 920-932.
17th National SAMPE Conference 17, pp. 147-160 (1985).
J. Org. Chem., vol. 25, pp. 1012-1015 (1960).
Makromol. Chem., vol. 78, pp. 112-120 (1964).

Primary Examiner—Joseph L. Schofer
Assistant Examiner—Wu C. Cheng
Attorney, Agent, or Firm—Ralph J. Mancini; Louis A. Morris

[57] ABSTRACT

A process for the preparation of a (co)polymer containing at least one unit derived from a citraconimide by curing curable composition comprising at least one substituted or unsubstituted citraconimide and a sufficient amount of an anionic curing catalyst to convert at least 10% of the citraconic alkyl groups on the citraconimide units to alkylene bridges; at a temperature above the melting point of the citraconimide unit and the product of that curing process, are disclosed. The invention also relates to the cured oligomers and articles of manufacture embodying them. These novel, cured oligomers are thermoplastic and offer several advantageous properties.

5 Claims, No Drawings

CITRACONIMIDE (CO)POLYMERS AND CURING WITH ANIONIC CATALYST

BACKGROUND OF THE INVENTION

The invention relates to citraconimide (co)polymers, a process for curing citraconimides with an anionic catalyst, and to articles of manufacture comprising the citraconimide (co)polymers.

Citraconimides and substituted citraconimides are known compounds. The radical copolymerizations of N-substituted citraconimides with styrene and methyl methacrylate are known from the Polymer Journal, Vol. 12, No. 11, pp. 799-807 (1980) and Polymer Journal, Vol. 13, No. 1, pp. 65-74 (1981) wherein azobisisobutyronitrile in a tetrahydrofuran solvent is employed as a polymerization initiator.

World patent application PCT/EP 90/01078 discloses the anionic curing of biscitraconimide (co)polymers using a process similar to that of the present invention. This non-prepublished application however, is limited to biscitraconimides and their copolymers and does not disclose the anionic curing of citraconimides.

Further, an attempt was made in, "Base-Catalyzed Polymerization of Maleimide and Some Derivatives and Related Unsaturated Carbonimides," Kojima, K., et al., Journ. Polym. Sci.: Part A-B, Vol. 4, 1121-1134 (1966), to cure citraconimides with a basic catalyst. In Table VII, however, it is indicated that no polymers or oligomers of the citraconimide were obtained from the reaction at 80° C. over a 24 hour period using sodium-tert-butoxide as the curing catalyst.

In "The Development of Tough Bismaleimide Resins," Stenzenberger, H.D., et al., 31st International SAMPE Symposium, Vol. 31, pp. 920-932 (1986) it is disclosed that bismaleimides are prime candidates for carbon fiber reinforced composites because of their properties. The article also discloses that bismaleimides have been cured in the presence of ionic curing catalysts such as imidazoles and tertiary amines including diazobicyclo-octane (DABCO).

In "Bismaleimide Resins the Properties and Processing of Compimide, BMI Resins," Segal, C.L., et al., 17th Nat. SAMPE Conference 17, pp. 147-160 (1985) formulated bismaleimides are cured with the ionic catalysts DABCO and 2-methyl imidazole.

European Patent Application 0,108,461 published on May 16, 1984, discloses, in example 4, the curing of bismaleimide resins having therein styrene, diallyl phthalate and acrylic acid, in the presence of DABCO.

Japanese patent publication no. 1230612 describes the use of anionic polymerization catalysts for the preparation of a vinyl block copolymer of styrene derivatives and n-substituted maleimides. DABCO is not mentioned in this publication.

Finally, Polymer, Vol. 6, pp. 419-426 (1965) discloses the anionic polymerization of some n-substituted maleimides with butyl lithium.

Generally, the bismaleimide resins require difficult processing conditions, exhibit solvent retention in the prepregs, have a high melting point and high curing temperatures are required for the monomer. In addition, the maleimide polymers are often brittle due to the high cross-link density obtained in the network polymers. The foregoing body of prior art reflects the need for imide resin systems which are easily processable and exhibit improved properties.

SUMMARY OF THE INVENTION

The present invention has for its object to eliminate the foregoing drawbacks of the prior art imide resins. For this purpose the present invention provides a process for curing imide compositions containing at least one citraconimide having the general formula I:

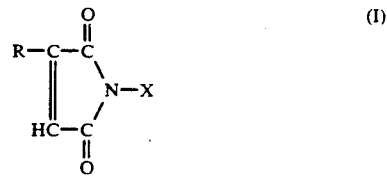

wherein R is $CH_2-R_1$, $R_1$ is hydrogen or a $C_1-C_{18}$ alkyl group and X is selected from the group consisting of hydrogen, alkyl, cycloalkyl, alkenyl, aryl, aralkyl and alkaryl, all of which may be unsubstituted or substituted with one or more carboxy, cyano, halogen, ester, oxirane, ether, nitro, hydroxy and alkoxy groups, characterized in that a sufficient amount of an anionic curing catalyst is employed in the process to convert at least 10% of the R groups on the citraconimide units into alkylene bridges in the cured composition and the citraconimide units are cured at a temperature above the melting point of the citraconimide.

The curing process produces oligomers of the citraconimides which can be further cross-linked or polymerized by virtue of the reactive groups carried by the molecules. For example, these materials can be used as a soluble, reactive oligomer in coating compositions The present invention, in another aspect, also relates to an oligomeric composition comprising at least two citraconimide units which has been cured with an anionic curing catalyst, and to articles of manufacture comprising an oligomer obtained by the curing process of the present invention.

DETAILED DESCRIPTION OF THE PREFERRED EMBODIMENTS

Citraconimides are known compounds and can be prepared by any of the methods disclosed in the following publications: Mehta, N.B., et al., J. Org. Chem., Vol. 25, p. 1012 (1960), Paesschen, G.V. and Timmerman, D., Makromol. Chem., Vol. 27, p. 112 (1964) and Oishi, T., Polymer Journal, Vol. 12, No. 11, pp. 799-807 (1980), the disclosures of which are hereby incorporated by reference.

The citraconimides employed in the present invention comprise compounds having the formula I:

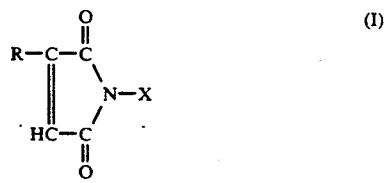

wherein R is $CH_2-R_1$, $R_1$ is hydrogen or $C_1-C_{18}$ alkyl groups and X is selected from the group consisting of hydrogen, alkyl, cycloalkyl, alkenyl, aryl, aralkyl and alkaryl, all of which may be unsubstituted or substituted with one or more carboxy, cyano, halogen, ester, oxirane, ether, nitro, hydroxy and alkoxy groups.

Suitable citraconimides include, but are not limited to, citraconimide and substituted citraconimides such as N-(t-butyl) citraconimide, N-(dodecyl) citraconimide, N-(octadecyl) citraconimide, 2-citraconimido acetic acid, 2-citraconimido propionic acid, 2-citraconimido-3-methyl butanoic acid, 6-citraconimido hexanoic acid, 2-citraconimido succinic acid, 1-citraconimido-2-phenyl propane, 2-citraconimido-1,2-propanediol, N-t-butyltriol citraconimide, N-(allyl) citraconimide, N-(oleyl)citraconimide, N-(3-chloropropyl) citraconimide, N-(furfuryl) citraconimide, N-(phenyl) citraconimide, 2-citraconimido-4-methyl-phenol, N-(4-bromophenyl) citraconimide, 4-citraconimido acetyl benzene, 4-citraconimido benzoic acid, 4-citraconimido nitrobenzene, 4-citraconimido phenol, 2-citraconimido isopropenyl benzene, N-benzyl citraconimide, N-pentyl citraconimide, N-2-hydroxy ethyl citraconimide and 2-citraconimido-1-methylethyl benzene.

The anionic catalysts employed in the present invention comprise generally known compounds which can be obtained commercially or can be prepared by known synthetic methods. In general, the anionic catalyst must exhibit catalytic activity in the polymerization or oligomerization of citraconimide-containing compositions at suitable polyermization temperatures. Anionic catalysts within the scope of the present invention comprise diazo-bicyclo alkanes, diazo-bicyclo alkenes, imidazoles, substituted imidazoles, the alkali salts or organic alcohols, triphenyl phosphine and substituted or unsubstituted aliphatic and aromatic secondary and tertiary amines. The most preferred catalysts for both economic and performance reasons are the diazo-bicyclo octane, triphenyl phosphine, and imidazoles including 2-methyl imidazole.

The anionic catalyst is present in an amount sufficient to convert at least 10% of the R groups of the formula I, on the citraconimide units into alkylene bridges. Typically, 0.01 to 3.0 weight percent of the anionic catalyst is employed, based on the total reaction composition. More preferably, 0.1 to 3.0 weight percent is used.

In particular, citraconimide compounds of the formula (I) are polymerized into polymers such as the following:

resulting from isomerization of the citraconimide units into itaconimide units under the reaction conditions. The itaconic isomerization can account for up to 80% or even slightly more of the units resulting from the present anionic curing process.

At least 10% of the original R groups on the citraconimide units are converted to these alkylene bridges in the cured oligomer in order to produce novel citraconimide oligomers having superior properties. More preferably, at least 25%, and most preferably at least 40% of the original R groups are converted to alkylene bridges and nearly 100% of the original citraconimide R groups can be converted to alkylene bridges, if desirable.

The curable composition which is cured by the curing process of the present invention may also comprise one or more cocurable materials. Suitable cocurable materials include bismaleimides, bicitraconimides, citraconic maleimides, itaconic maleimides, citraconic/itaconic maleimides, bis(allyl trimellitate imides), bisitaconimides, itaconimides, maleimides and aromatic or aliphatic amines which may be present in an amount of up to 50% of the composition, and triallyl cyanurate, triallyl isocyanurate, and olefinically unsaturated monomers such as diallyl phenol, styrene and styrene derivatives such as α-methylstyrene, indene and diisopropenyl benzene which may be present in an amount of up to 25% of the composition.

The present invention also embodies cured oligomeric materials comprising units derived from a citraconimide of the formula (I) wherein at least 10% of the R groups on the citraconimide units are converted to alkylene bridges as a result of curing in the presence of an anionic catalyst. Again, these cured oligomeric materials may include units derived from one or more of the cocurable materials specified herein. More preferably, the cured oligomeric compound of the present invention has at least 25%, and most preferably at least 40% of the R groups on the citraconimide units converted to alkylene bridges.

The curing process of the present invention must be carried out in the presence of an anionic catalyst. The curing is carried out by simply heating a composition containing at least one citraconimide of the formula (I), an anionic catalyst and, optionally, a cocurable material, to a temperature above the melting point of the citraconimide and maintaining the temperature at that level for a sufficient time to cure the material into a cured oligomeric product. Curing can be accomplished at 150° C. to 250° C. Generally, the curing will be accomplished at a temperature in excess of 180° C. The curing time will vary depending upon the amount of catalyst present and type of material being cured.

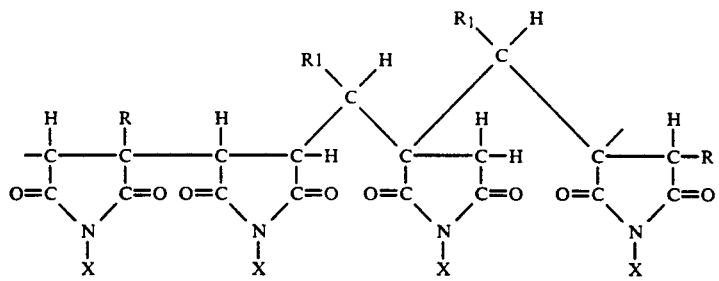

(II)

wherein X, R and $R_1$ have the same meaning as in the formula I. In these polymers there is included, in addition to the expected cross-linking, additional alkylene bridges between the polymer units such as the alkylene bridges shown in the formula II. These alkylene bridges may link a carbon atom in the citraconimide unit having an abstractable hydrogen atom attached. The alkylene bridges will always be formed by a linking methylene group.

As in shown in formula II, there are essentially four possibilities with the two leftmost being the linking of the original citraconimide units formed by 1,2 or 1,3 addition, and the two rightmost having a spiro form, The cured oligomeric product of the present invention is particularly useful in injection molding since it is a thermoplastic oligomer. It is also useful in coating compositions as a soluble, reactive oligomer which can be cross-linked or cured in the coating composition.

The invention will be further described with reference to the following examples which are not to be construed as limiting the scope of the invention.

EXAMPLES 1-21

In examples 1-21, 21 different citraconimides were cured in the presence of diazobicyclooctane for a period of 20 hours at 180° C. The solidity of the resultant oligomer was observed with "A" indicating a solid oligomer and "B" indicating a soft oligomer, at a temperature of 180° C. and at room temperature. Then the TGA's at 5% and 10% were measured. The results are given in Table 1.

TABLE 1

| | Citraconimide | 80° C. | RT | TGA 5% | TGA 10% | Mw Distr. |
|---|---|---|---|---|---|---|
| 1. | N-(dodecyl)citraconimide | B | B | 230 | 250 | |
| 2. | N-(octadecyl)citraconimide | B | A | 293 | 323 | 600–10000 |
| 3. | N-(acetic)citraconimide | A | A | 236 | 261 | 400–1000 |
| 4. | N-(propionic)citraconimide | B | B | | | 400–2400 |
| 5. | N-(β-3-methylbutyric)citraconimide | B | A | 229 | 266 | 400–2500 |
| 6. | N-(hexanoic)citraconimide | B | B | | | 400–3000 |
| 7. | N-(butyrate)citraconimide | B | A | 293 | 323 | 400–3000 |
| 8. | N-(propanediol)citraconimide | B | A | 276 | 306 | |
| 9. | N-(propene)citraconimide | B | A | 260 | 317 | |
| 10. | N-(octadecene)citraconimide | B | B | | | 600–10000 |
| 11. | N-(3-chloropropane)citraconimide | B | B | | | 400–5000 |
| 12. | N-(2-methylfuran)citraconimide | B | A | | | 400–5000 |
| 13. | Citraconimide | A | A | 263 | 300 | |
| 14. | N-(phenyl)citraconimide | A | A | 292 | 327 | 400–2000 |
| 15. | N-(3-methyl-5-hydroxyphenyl)-citraconimide | B | A | 272 | 299 | 400–2200 |
| 16. | N-(4-bromophenyl)citraconimide | A | A | 299 | 332 | 600–2500 |
| 17. | N-(4-acetoxyphenyl)citraconimide | A | A | | | 400–7000 |
| 18. | N-(4-carboxyphenyl)citraconimide | A | A | 296 | 337 | 500–2500 |
| 19. | N-(4-nitrophenyl)citraconimide | A | A | | | 500–7000 |
| 20. | N-(4-hydroxyphenyl)citraconimide | A | A | 305 | 329 | 500–2500 |
| 21. | N-(2-isopropenylphenyl)citraconimide | B | A | 183 | 207 | 400–2500 |

The foregoing examples were presented for the purposes of illustration and description only and are not to be construed as limiting the invention in any way. The scope of the invention is to be determined by the claims appended hereto.

What is claimed is:

1. A process for the preparation of a (co)polymer from a composition comprising at least one unit derived from a citraconimide having the formula:

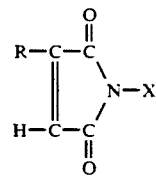

wherein R is $CH_2-R_1$, $R_1$ is hydrogen or a C1–C18 alkyl group and X is selected from the group consisting of hydrogen, alkyl, cycloalkyl, alkenyl, aryl, aralkyl and alkaryl, all of which may be unsubstituted or substituted with one or more carboxy, cyano, halogen, ester, oxirane, ether, nitro, hydroxy and alkoxy groups; and a sufficient amount of an anionic curing catalyst to convert at least 10% of the R groups on the citraconimide units into alkylene bridges in the cured composition, said composition being cured at a temperature above the melting point of the citraconimide unit to produce citraconimide oligomers.

2. The process of claim 1 wherein said composition further comprises one or more (co)curable compounds selected from the group consisting of maleimides, itaconimides, biscitraconimides, bismaleimides, citraconic maleimides, itaconic maleimides, citraconic/itaconic imides, bis-(allyl trimellitate imides), bisitaconimides, and aromatic or aliphatic amides.

3. The process of claim 2 wherein the (co)curable compounds comprise up to 25 molar percent of the composition based on the moles of citraconimide and may additionally be selected from the group consisting of triallyl cyanurate, triallyl isocyanate, and olifinically unsaturated monomers or oligomers.

4. The process of claim 1 wherein said anionic curing catalyst is selected from the group consisting of diazobicyclo alkanes and substituted imidazoles and comprises 0.01 to 3.0 weight percent of said composition.

5. The process of claim 1 wherein a sufficient amount of anionic curing catalyst is present to convert at least 40% of the R groups on the citraconimide units into alkylene bridges in the cured composition.

* * * * *